(12) United States Patent
Hou et al.

(10) Patent No.: US 11,478,947 B2
(45) Date of Patent: Oct. 25, 2022

(54) ELASTIC SELF-POSITIONING PRE-DICING DEVICE AND METHOD

(71) Applicants: QINGDAO UNIVERSITY OF TECHNOLOGY, Shandong (CN); INNER MONGOLIA UNIVERSITY FOR NATIONALITIES, Inner Mongolia (CN)

(72) Inventors: Yali Hou, Qingdao (CN); Changhe Li, Qingdao (CN); Dongzhou Jia, Qingdao (CN); Huayang Zhao, Qingdao (CN); Yuhui Zhao, Qingdao (CN); Wenyue Liu, Qingdao (CN); Zhongqi Lu, Qingdao (CN); Dan Liu, Qingdao (CN); Yucheng Wang, Qingdao (CN); Yanbin Zhang, Qingdao (CN); Min Yang, Qingdao (CN)

(73) Assignees: QINGDAO UNIVERSITY OF TECHNOLOGY, Qingdao (CN); INNER MONGOLIA UNIVERSITY FOR NATIONALITIES, Tongliao (CN)

( * ) Notice: Subject to any disclaimer, the term of this patent is extended or adjusted under 35 U.S.C. 154(b) by 188 days.

(21) Appl. No.: 16/960,355

(22) PCT Filed: Oct. 30, 2019

(86) PCT No.: PCT/CN2019/114430
§ 371 (c)(1),
(2) Date: Jul. 7, 2020

(87) PCT Pub. No.: WO2020/238005
PCT Pub. Date: Dec. 3, 2020

(65) Prior Publication Data
US 2021/0402637 A1    Dec. 30, 2021

(30) Foreign Application Priority Data

May 28, 2019 (CN) .......................... 201910452454.5

(51) Int. Cl.
B26D 7/06    (2006.01)
A01C 1/00    (2006.01)
B26D 1/02    (2006.01)

(52) U.S. Cl.
CPC ............ B26D 7/0625 (2013.01); A01C 1/005 (2013.01); B26D 1/02 (2013.01); *B26D 2210/02* (2013.01)

(58) Field of Classification Search
CPC .... B26D 7/0625; B26D 1/02; B26D 2210/02; A01C 1/005
See application file for complete search history.

(56) References Cited

U.S. PATENT DOCUMENTS 1,347,058 A    7/1920   Schroeder
3,688,828 A    9/1972   Peterson
(Continued)

FOREIGN PATENT DOCUMENTS

CN    102870531 A    1/2013
CN    106471942 A    3/2017
(Continued)

OTHER PUBLICATIONS

Mar. 2, 2020 International Search Report issued in International Patent Application No. PCT/CN2019/114430.
(Continued)

*Primary Examiner* — Omar Flores Sanchez
(74) *Attorney, Agent, or Firm* — Oliff PLC

(57) ABSTRACT

An elastic self-positioning pre-dicing device and method, the device includes a V-shaped self-positioning device, a cutter and a separation device; the V-shaped self-positioning device includes first and second elastic conveying faces which form a V-shaped conveying space, and materials are kept in a vertical state when arriving at a bottom end between the two elastic conveying faces with the conveying (Continued)

of the faces; the cutter is arranged at the bottom end between the two faces to cut the materials in half along a long axis; and the separation device is arranged at the lower part of the cutter and configured to convey the materials cut in half to next stage respectively. This overcomes the defects of low efficiency in manual dicing of seed potatoes and waste of seed potatoes. The half-cut seed potatoes will be conveyed to next intelligent dice identification station to ensure high utilization of seed potato production.

8 Claims, 4 Drawing Sheets

(56) References Cited

U.S. PATENT DOCUMENTS

| | | | | |
|---|---|---|---|---|
| 3,974,725 A | * | 8/1976 | Boots | B26D 1/28 |
| | | | | 241/281 |
| 10,894,333 B2 | * | 1/2021 | Turatti | B26D 3/26 |

| | | | | |
|---|---|---|---|---|
| 2009/0056519 A1 | * | 3/2009 | Moore | B26D 1/24 |
| | | | | 83/873 |
| 2012/0064214 A1 | * | 3/2012 | Moore | B26D 3/26 |
| | | | | 83/435 |

FOREIGN PATENT DOCUMENTS

| | | |
|---|---|---|
| CN | 206498889 U | 9/2017 |
| CN | 108437044 A | 8/2018 |
| CN | 110089231 A | 8/2019 |
| GB | 1145674 A | 3/1969 |
| KR | 20170055727 A | 5/2017 |

OTHER PUBLICATIONS

Mar. 2, 2020 Written Opinion issued in International Patent Application No. PCT/CN2019/114430.

* cited by examiner

Satisfy: $G + 2 \cdot F_{f1} \cdot \cos \alpha > 2 \cdot F_R \cdot \cos \alpha$

In the formula, $F_{f1} = F_{f2}$, $F_{R1} = F_{R2}$.

ELASTIC SELF-POSITIONING PRE-DICING DEVICE AND METHOD

FIELD OF THE INVENTION

The present invention relates to the technical field of agricultural machinery, in particular to an elastic self-positioning pre-dicing device and method.

BACKGROUND OF THE INVENTION

The statement of this section merely provides background information related to the present invention, and does not necessarily constitute the prior art.

The breeding method of potatoes is vegetative propagation. About 20 days before planting, seed potatoes need to be diced for breeding. The conventional potato dicing for breeding is manual dicing, and the manual dicing is wasteful of human resources, uneven-dice, and high in production cost. In order to facilitate intelligent dice identification, uniform half-cut pre-dicing treatment is required for the seed potatoes. The data shows that half cut along the long axis of the seed potatoes has an optimal effect.

The inventors searched and found that the existing technology discloses a potato seed cutter. The position for fixing the cutter head is selected according to the size and shape of seed potatoes. The potato seed cutter can solve the planting pain of cutting seed potatoes when peasants plant potatoes, and has the advantages of simple structure, convenient operation, high efficiency, matching disinfection, less labor, low production cost, low labor intensity and the like. However, the potato seed cutter still has large manual input, cannot achieve effective positioning of seed potatoes, cannot be applied to intelligent identification systems, and is still low in the utilization of seed potatoes.

SUMMARY OF THE INVENTION

In order to solve the above problems, the present invention proposes an elastic self-positioning pre-dicing device and method, which can overcome the defects of low efficiency, uneven dicing, and waste of seed potatoes in manual dicing of the seed potatoes, realizes dynamic positioning of the seed potatoes in the process of straight transportation, and is highly mechanized.

In some embodiments, the following technical solution is adopted: An elastic self-positioning pre-dicing device comprises a V-shaped self-positioning device, a cutter and a separation device; the V-shaped self-positioning device comprises a first elastic conveying face and a second elastic conveying face, the first elastic conveying face and the second elastic conveying face form a V-shaped conveying space, and materials are kept in a vertical state when arriving at a bottom end between the two elastic conveying faces with the conveying of the elastic conveying faces; the cutter is arranged at the bottom end between the two elastic conveying faces to cut the materials in half along a long axis; and the separation device is arranged at the lower part of the cutter and configured to convey the materials cut in half to next stage respectively.

The first elastic conveying face and the second elastic conveying face are provided by a first conveying mechanism and a second conveying mechanism, and the first conveying mechanism and the second conveying mechanism are symmetrically arranged in a V shape.

In some other embodiments, the following technical solution is adopted:

An elastic self-positioning pre-dicing method, comprises: conveys materials in a limit manner by flexible conveying belts arranged in a V shape, the materials fall vertically in the direction of a long axis, and finally fall to the cutter; cuts the materials in half along the long axis by the cutter; conveys the materials cut in half to next process respectively; and during the falling of the materials, adaptively adjusts the flexible conveying belts according to the size of the materials.

Compared with the prior art, the beneficial effects of the present invention are:

The present invention relies on V-rollers and springs to realize the multi-level self-positioning function, ensure the dicing stability of seed potatoes and adapt to the shape and size of the seed potatoes, and overcome instability factors in the existing manual dicing, thereby realizing the uniformity, high efficiency and reliability of dicing of the seed potatoes.

The present invention overcomes the defects of low efficiency in manual dicing of seed potatoes and waste of seed potatoes. The half-cut seed potatoes will be conveyed to next intelligent dice identification station to ensure high utilization of seed potato production.

The present invention is not only applicable to pre-dicing of seed potatoes, but also applicable to other occasions where materials need to be pre-diced.

In the figures: I-01 first drive gear; I-02 first pulley; I-03 first V-belt; I-04 motor; I-05 second drive wheel; I-06 streamlined cutter; I-07 third pulley; I-08 third drive gear; I-09 second drive steering gear; I-10 second V-belt; I-11 fourth pulley; I-12 outer frame fixing plate; I-13 thread; I-14 nut; I-15 outer enveloping clamping plate; I-16 flexible silicone conveying belt; I-17 V-roller; I-18 first spring; I-19 anti-rollover housing; I-20 screw; I-21 triangular conveying belt; I-22 bolt; I-23 triangular guard; I-24 first rhombic spherical bearing seat; I-25 fixed shaft; I-26 second spring; I-27 second rhombic spherical bearing seat; I-28 drive shaft, I-29 smooth drive center shaft; I-30 cylindrical roller drive shaft.

DETAILED DESCRIPTION OF THE EMBODIMENTS

It should be noted that the following detailed descriptions are exemplary and are intended to provide further descriptions of the present application. All technical and scientific terms used herein have the same meaning as commonly understood by those of ordinary skill in the technical filed to which the present application belongs, unless otherwise indicated.

It should be noted that terms used herein are intended to describe specific embodiments only rather than to limit the exemplary embodiments according to the present application. As used herein, the singular form is also intended to comprise the plural form unless otherwise indicated in the context. In addition, it should be understood that when the terms "include" and/or "comprise" are used in the description, they are intended to indicate the presence of features, steps, operations, devices, components and/or combinations thereof.

Embodiment 1

Figure 1:
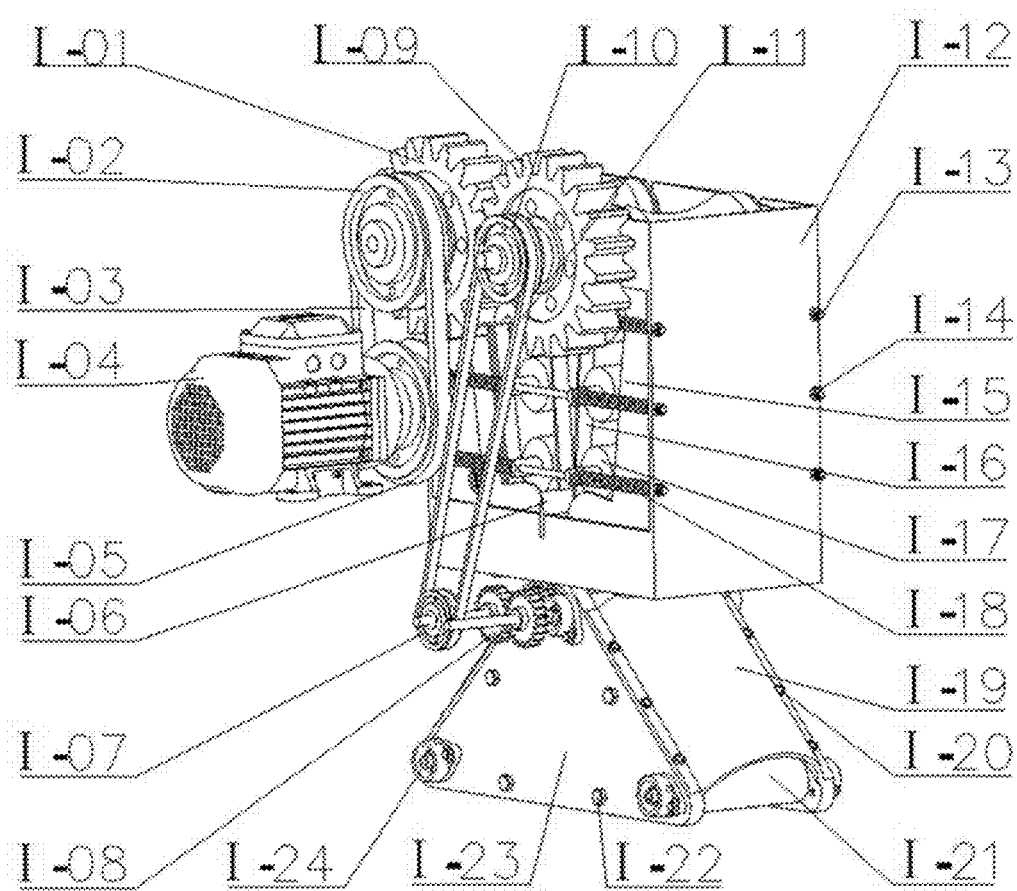
FIG. 1 is an isometric view of an elastic self-positioning seed potato pre-dicing device according to an embodiment of the present invention.

As introduced in the background section, in order to solve the deficiencies in the prior art, this embodiment proposes an elastic self-positioning pre-dicing device, as shown in FIG. 1, comprising: an elastic V-shaped self-positioning device, a streamlined cutter I-06 and a triangular separation device, which three devices are coaxial to ensure tight connection of three processes of straight conveying, half cut and half-cut conveying of seed potatoes.

The elastic V-shaped self-positioning device comprises a first elastic conveying face and a second elastic conveying face, the first elastic conveying face and the second elastic conveying face form a V-shaped conveying space, and materials are kept in a vertical state when arriving at a bottom end between the two elastic conveying faces with the operating of the elastic conveying faces; the cutter is arranged at the bottom end between the two elastic conveying faces to cut the materials in half along a long axis; and the separation device is arranged at the lower part of the cutter and configured to convey the materials cut in half to next stage respectively.

The first elastic conveying face and the second elastic conveying face are provided by a first conveying mechanism and a second conveying mechanism, and the first conveying mechanism and the second conveying mechanism are symmetrically arranged in a V shape.

Figure 3:
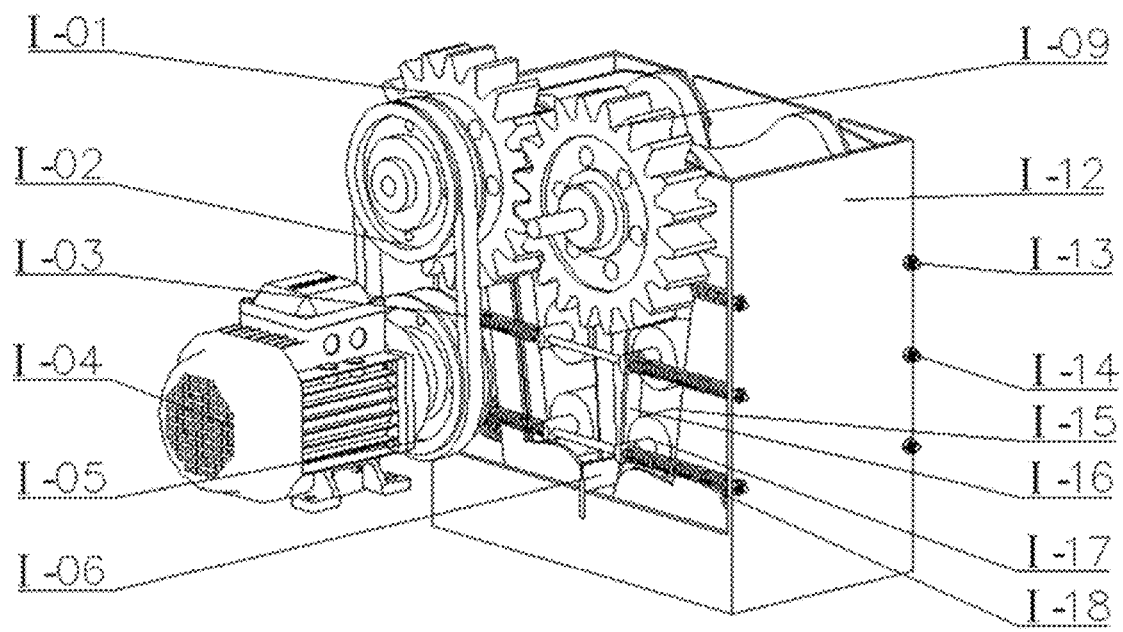
FIG. 3 is an isometric view of an elastic V-shaped self-positioning device according to an embodiment of the present invention.

As shown in FIG. 1 and FIG. 3, a second drive wheel I-05 is arranged on an output shaft of a motor I-04, and the second drive wheel I-05 is connected with a first pulley I-02 through a first V-belt I-03 to realize belt drive; the first pulley is connected with a first drive shaft, the first drive shaft rotates to drive a first drive gear I-01 to rotate, the first drive gear I-01 is meshed with a second drive gear I-09, and the second drive gear I-09 is arranged on a second drive shaft; the first drive shaft serves as a power drive shaft of the first conveying mechanism, and the second drive shaft serves as a power drive shaft of the second conveying mechanism.

A fourth pulley I-11 is arranged on the second drive shaft, and the fourth pulley I-11 is connected with a third pulley I-07 through a second V-belt I-10 to realize belt drive; the third pulley I-07 rotates to drive a third drive gear I-08 to rotate, and the third drive gear I-08 is meshed with a gear arranged on the triangular separation device to provide power for the belt drive on the triangular separation device.

Figure 2:
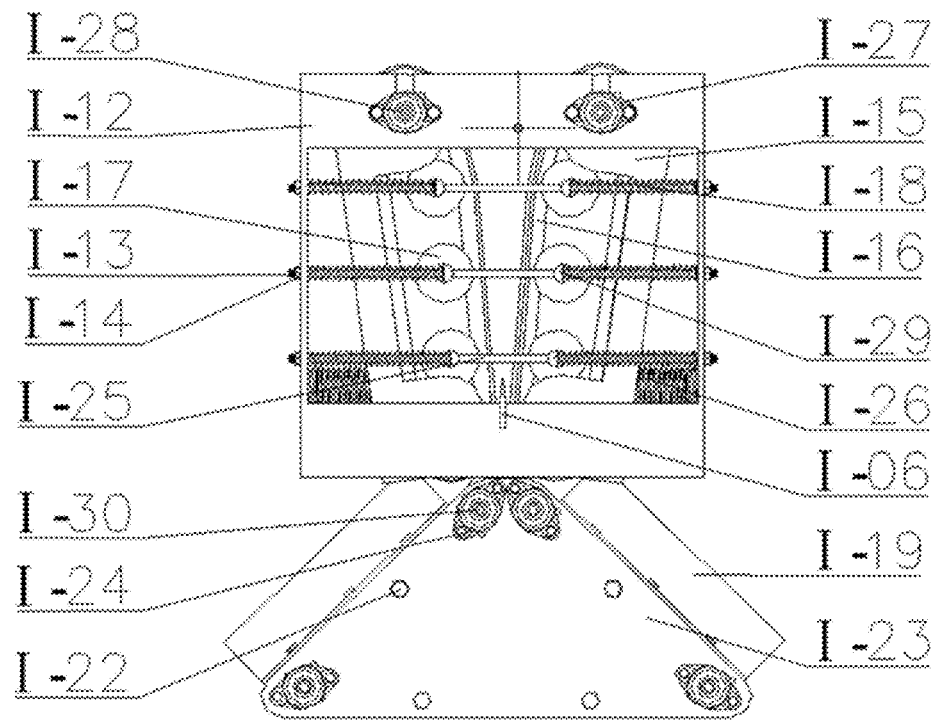
FIG. 2 is a front view of the elastic self-positioning seed potato pre-dicing device according to an embodiment of the present invention.

As shown in FIG. 2 and FIG. 3, the elastic V-shaped self-positioning device is provided with five pairs of V-rollers I-17 distributed in parallel and symmetrically, the upper and lower pairs of V-rollers I-17 are fixed to drive shafts by pins, the drive shafts penetrate through second rhombic spherical bearing seats I-27, the second rhombic spherical bearing seats I-27 are fixed to outer enveloping clamping plates I-15 by bolt connection, upper drive shafts I-28 as power input shafts are longer and penetrate through the second rhombic spherical bearing seats I-27, the second rhombic spherical bearing seats I-27 are fixed to an outer frame fixing plate I-12 by bolt connection, and the outer frame fixing plate I-12 is fixedly connected with outer frame bolts to achieve the fixation of the upper and lower pairs of V-rollers I-17.

The upper and lower V-rollers I-17 are sleeved with flexible silicone conveying belts I-16, so that the flexible silicone conveying belts I-16 show a V-shaped profile to facilitate V-shaped positioning, and then seed potatoes are conveyed stably and straightly during pre-dicing by using the flexibility and high friction of the flexible silicone conveying belts I-16. Meanwhile, the remaining three pairs of V-rollers I-17 are arranged on smooth center shafts I-29, two shaft clamps are arranged on each smooth center shaft I-29 so that the V-rollers I-17 are located in the middle of the smooth drive shaft, two planes are milled at both ends of the smooth center shaft I-29, and each plane is drilled with a hole slightly larger than a fixed shaft I-25, so that the smooth center shafts I-29 can slide on the fixed shafts I-25.

V-roller bushings penetrate through the flexible silicone conveying belts I-16, a first spring I-18 is mounted between the plane where each smooth center shaft hole is located and the outer frame fixing plate I-12, the outer frame fixing plate I-12 is drilled with six pairs of holes matching with the fixed shafts I-25, the fixed shafts I-25 are provided with threads at both ends, and contact the outer frame fixing plate I-12 by the threads I-13 and nuts I-14 cooperating with each other, to limit the travel.

The V-rollers I-17 tension the flexible silicone conveying belts I-16 inwards under the action of the first springs I-18 to better achieve a V-shaped space between the opposite flexible silicone conveying belts I-16, and a better guarantee is provided for the stable and straight conveying of the seed potatoes by using the V-shaped positioning principle under the good enveloping property of the two pairs of flexible silicone conveying belts I-16.

Figure 4:
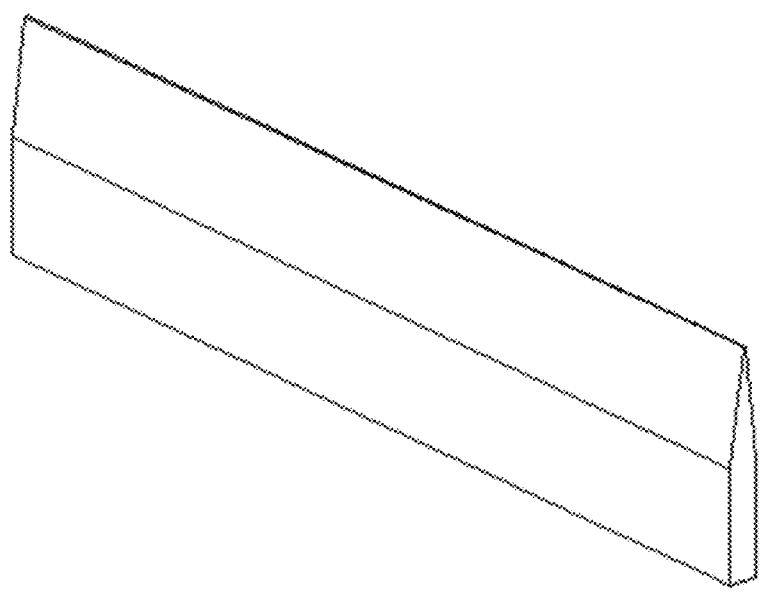
FIG. 4 is a schematic diagram of a streamlined cutter according to an embodiment of the present invention.

Meanwhile, an arc guide bar is welded and fixedly connected to the outer side of each outer enveloping clamping plate I-15, a hole is provided at the corresponding position of the outer frame fixing plate I-12, and a second spring I-26 is mounted on the arc guide bar. Then, the fixed shafts I-25 penetrates through the holes, and the nuts I-14 are mounted on the outer side of the outer frame fixing plate I-12, so that the angles of the two outer enveloping clamping plates I-15 placed oppositely can be adjusted to adapt to the shape and size of different varieties of seed potatoes, and the reliability and stability of sliding of the arc guide bars within the holes are also ensured. A pair of outer enveloping clamping plates I-15 is placed in a V-shaped, which ensures the stability of straight conveying of the seed potatoes, and also ensures certain pressure on the seed potatoes in a direction perpendicular to the flexible silicone conveying belts I-16 when the seed potatoes are in contact with the streamlined cutter I-06, to increase the friction between the seed potatoes and the flexible silicone conveying belts I-16, so that the seed potatoes are reasonably stressed and can be pre-cut in half. As shown in FIG. 4, the streamlined cutter I-06 is of a streamlined shape widened from top to bottom, the narrower upper end ensures that the cutter is sharp enough, and the lower end has a certain width to achieve adaptable separation of the seed potatoes after dicing. The seed potatoes cut in half and separated will enter the triangular separation device under the guidance of the cutter back and the further conveying of the conveying belts.

Figure 5:
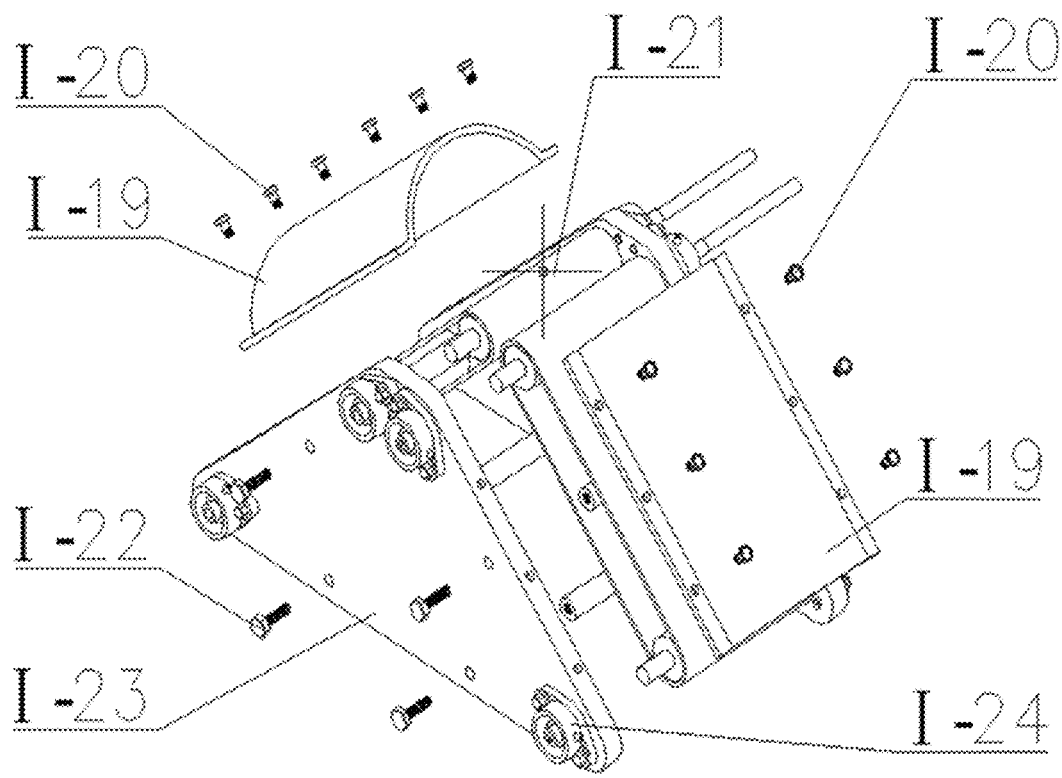
FIG. 5 is an exploded view of a triangular separation device according to an embodiment of the present invention.

As shown in FIG. 5, the triangular separation device comprises: two triangular conveying belts I-21, two triangular guards I-23, cylindrical roller drive shafts I-30 and an anti-rollover housing I-19. The two triangular conveying belts I-21 and the drive wheels respectively constitute a third conveying mechanism and a fourth conveying mechanism, and the third conveying mechanism and the fourth conveying mechanism are arranged in an inverted V shape and interfaced with the conveying faces of the V-shaped conveying space. The materials cut in half are conveyed by the third conveying mechanism and the fourth conveying mechanism respectively, and the cut surfaces of the materials are in contact with the conveying mechanisms.

The triangular conveying belts I-21 are made of flexible silicone to ensure certain tension thereof, the cylindrical roller drive shafts I-30 are connected by pins, the cylindrical roller drive shafts I-30 penetrate through first rhombic spherical bearing seats I-24 and are connected with the triangular guards I-23 by bolts I-22, the triangular guards I-23 are also fixedly connected to an outer frame of the machine by bolts, and the distance between the two triangular guards I-23 matches with the cylindrical roller drive shafts I-30. In order to ensure equal distance, three equal-length polished shafts are added between the triangular guards I-23 for limit check, and connected by screws I-20 to contact the inner sides of the triangular guards I-23, to achieve equal distance everywhere between the triangular guards I-23. The triangular guards I-23 on the one hand ensure that the cylindrical roller drive shafts I-30 will not move axially, and can prevent the half-cut seed potatoes from turning over on the other hand.

The devices of above structure constitute an elastic self-positioning pre-dicing system, which can realize the half pre-cut function of the seed potato production process, and is safe, stable, efficient and highly reliable, and can realize self-positioning and self-adaption to the shape and size of seed potatoes by means of V-shaped positioning at three places and elastic holding of the springs.

As shown in FIG. 1, the drive system of the elastic self-positioning pre-dicing system adopts belt drive to drive the V-roller drive shafts I-17 to rotate, the elastic V-shaped self-positioning device conveys power between the two power drive shafts I-28 by means of drive of the first drive steering gear I-01, to realize synchronous movement of the two flexible silicone conveying belts I-16 placed vertically, and then the cylindrical roller drive shafts I-30 of the triangular separation device are controlled again by the belt drive to have a rotation speed slightly higher than the movement speed of the flexible silicone conveying belts I-16 placed vertically, thereby facilitating the separation of the half-cut seed potatoes.

The flexible silicone conveying belts I-16 in the elastic V-shaped self-positioning device are required to run stably, thereby providing a stable dicing environment for the seed potatoes. The belt drive has the advantages of stability, buffering, shock absorption, simple structure and low cost, so the belt drive is used as the drive system of the elastic V-shaped self-positioning device. The flexible silicone conveying belts I-16 in the elastic V-shaped self-positioning device are ensured to have the same speed in opposite directions, that is, the two power drive shafts are required to rotate synchronously in opposite directions. The first drive steering gear I-01 is used for drive, so the drive ratio is accurate and stable, the operational reliability is high, and the service life is long. For the drive of the conveying belts in the triangular separation device, considering that the triangular separation device has a small size and a compact structure and the production speed needs to be adjusted according to the actual production situation, it is more in line with the actual situation to control the speed of the triangular separation device by the belt drive. After experimental test, the design of the above drive system can achieve the desired effect, so the selection is correct and the design requirements are met.

Figure 6:
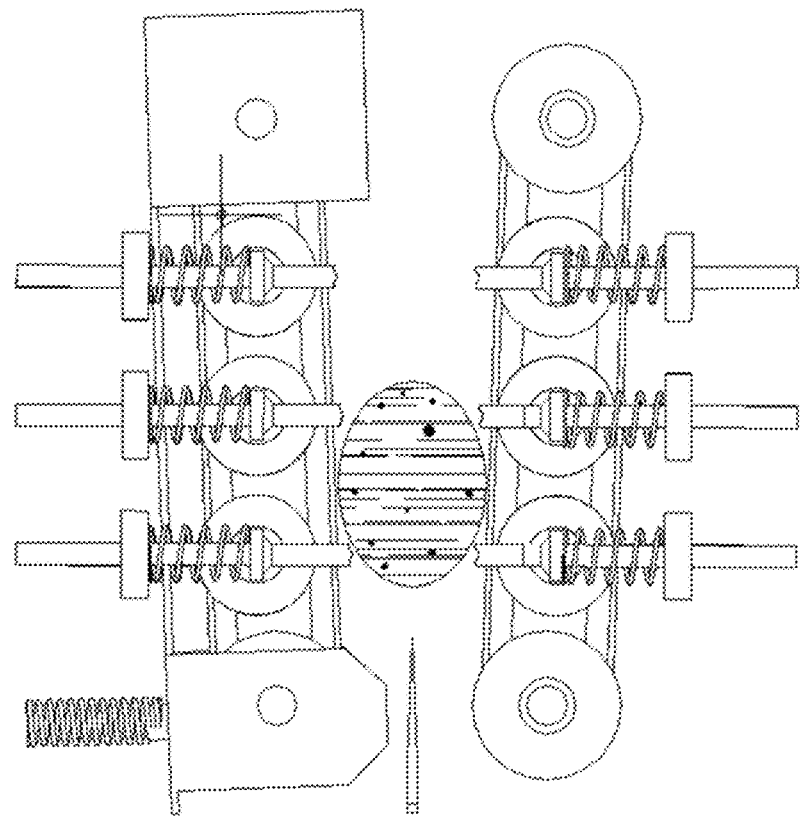
FIG. 6 is a state diagram of a seed potato at a half-cut position according to an embodiment of the present invention.

Feasibility analysis of the elastic self-positioning pre-dicing system and selection of springs In order to realize the self-adaptation of the elastic V-shaped positioning device to the shape of seed potatoes, and to ensure good stability when the seed potatoes are in contact with the streamlined cutter I-06, three groups of first springs I-18 are mounted on the guide bars of rotating shafts of the middle three pairs of V-rollers I-17, and a group of second springs I-26 is also connected between the outer enveloping clamping plates I-15 and the outer frame fixing plate I-12. According to force analysis and actual requirements, these four groups of springs are all cylindrical helical springs. During the straight conveying process of the elastic V-shaped positioning device, the position status of seed potatoes is shown in FIG. 6.

Figure 7:
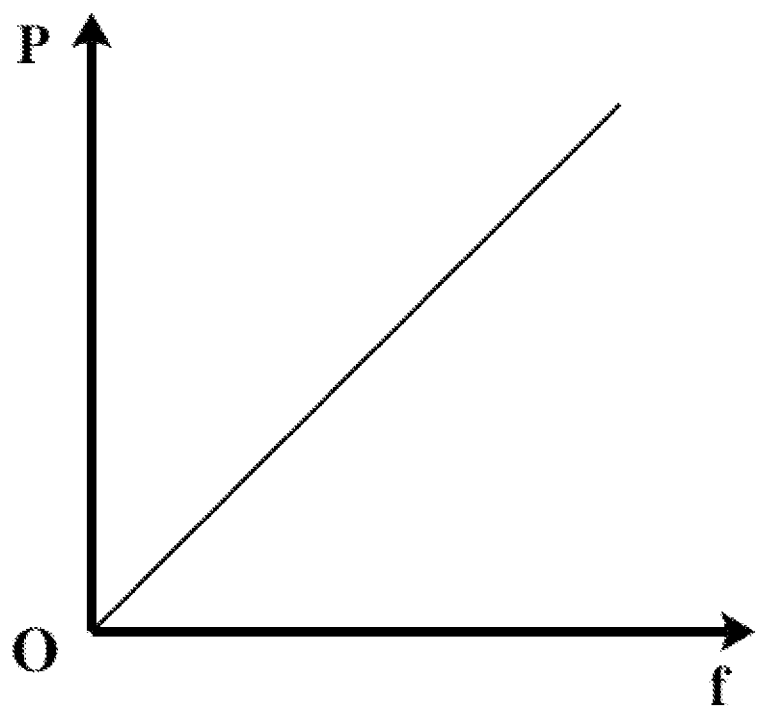
FIG. 7 is a characteristic curve of a cylindrical helical spring according to an embodiment of the present invention.

The cylindrical helical springs have a linear characteristic curve, are stable in rigidity, simple in structure, convenient to manufacture and wide in application, and are mostly used in mechanical equipment for buffering, shock absorption, energy storage and movement control, and their characteristic curve is shown in FIG. 7.

The diameters of the guide bars where the cylindrical helical springs are located are 8 mm, and the diameter of the spring material is 13 mm, which satisfies ≤13 mm, so the spring material is of carbon spring steel wire class C. The compression springs with large height-diameter ratios b are bent laterally and loses the stability when the axial loads reach certain values. In order to ensure stable use, the height-diameter ratio $b=H_0/D$ should meet the following requirements:

| | |
|---|---|
| Two ends are fixed | b ≤ 5.3 |
| One end is fixed and the other end is rotatable | b ≤ 3.7 |
| Two ends are rotatable | b ≤ 2.6 |

When the height-diameter ratio b does not meet the actual requirements, it can be calculated according to the following formula:

$$P_c = C_B \times P' \times H_0 > P_a \qquad (1)$$

In the formula, $P_c$—critical load of a spring I-18, N;
$C_B$—Instability coefficient, which is looked up from the mechanical design manual;
$P'$—Stiffness of the spring I-18, N/mm;
$P_n$—Maximum working load, N.

A range of the height-to-diameter ratio b can be determined by the calculation with the formula, and then the height $H_0$ of the spring I-18 is determined. Therefore, the stability of the cylindrical helical compression springs is guaranteed.

Analysis and calculation of friction of flexible silicone conveying belts

Figure 8:
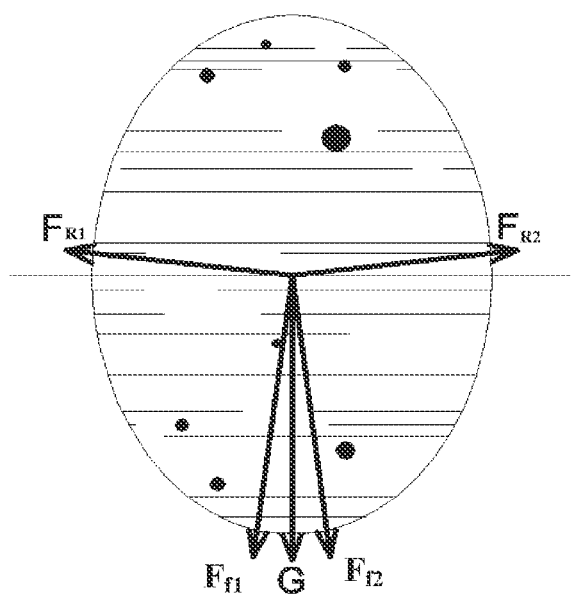
FIG. 8 is a force analysis diagram of a seed potato in the process of straight conveying according to an embodiment of the present invention.

The seed potatoes are in contact with the flexible silicone conveying belts during the straight conveying process, and the friction generated by the flexible silicone conveying belts drives the seed potatoes to move to the streamlined cutter for further contact with the cutter to overcome the impact of the cutter on the seed potatoes, thereby realizing the half cut process of the seed potatoes. After the half cut is completed, the seed potatoes are conveyed by the triangular separation device, the conveying belts here are still the flexible silicone conveying belts I-16, and the large friction of the conveying belts prevent the half-cut seed potatoes from deviating and rolling over. The stress analysis of seed potatoes in the upright state is shown in FIG. 8.

When the seed potatoes are in contact with the streamlined cutter I-06, the seed potatoes will receive a vertical upward support force. To convey the seed potatoes by the flexible silicone conveying belts I-16 to complete the half cut process, the following formula must be satisfied:

$$G + 2 \times F_f \times \cos\alpha > 2 \times F_R \times \cos\alpha + F_N \quad (2)$$

In the formula, G—Gravity of a seed potato itself, N;
$F_f$—Friction subjected by the seed potato in the upright state during the straight conveying process, where $F_{f1} = F_{f2}$, N;
$F_R$—Resultant force simplified from spring force subjected by the seed potato, in the direction perpendicular to the conveying belts, N;
$F_N$—Support force of the streamlined cutter I-06 for the seed potato, N;
α—Angle between the outer enveloping clamping plate I-15 and the horizontal plane, °;

The friction of the flexible silicone conveying belts will be analyzed in detail below. Looked up from the mechanical design manual, the sliding friction coefficient is 0.48 under dry friction between rubbers (parallel textures). Silicone is a kind of rubber. The potato skin is regarded as a rubber with parallel textures, and is in a critical state of sliding generation during the conveying process of the flexible silicone conveying belts, which can be regarded as a sliding friction for further analysis on this basis. The formula for calculating the friction subjected by the potato can be expressed as:

$$F_f = \mu \times F_{N1} \quad (3)$$

In the formula, μ—friction coefficient, which is 0.48 looked up from the mechanical design manual;
$F_{N1}$—Support force subjected by the seed potato in the upright state during the straight conveying process, N, that is:

$$F_{N1} = 3 \times P_c \times \sin\alpha \quad (4)$$

The value of α ranges from 70° to 80° by calculation according to the design requirements, the spring has a diameter of d and a length of $H_0$, and the value of $P_c$ can be calculated according to formula (1).

$$P_c = C_B \times P' \times H_0 \quad (5)$$

In the formula, $P_c$—Critical load of a spring, N;
$C_B$—Instability coefficient, which is looked up from the mechanical design manual;
P'—Stiffness of the spring, N/mm;

The parameters are brought into formula (2) and arranged to obtain:

$$G + 6 \times \mu \times C_B \times P' \times H_0 \times \sin^\alpha \times \cos^\alpha > 2 \times C_B \times P' \times H_0 \times \cos^\alpha + F_N \quad (6)$$

$$\mu > \frac{2 \times C_B \times P' \times H_0 \times \cos^\alpha + F_N - G}{6 \times C_B \times P' \times H_0 \times \sin^\alpha \times \cos^\alpha} \quad (7)$$

Whether μ=0.48 satisfies the formula is verified. After μ=0.48 is introduced, it meets the design requirements. That is, the flexible silicone conveying belts are appropriate and meet the friction requirements.

Embodiment 2

In some embodiments, an elastic self-positioning pre-dicing method is disclosed, comprising the following process:

A tapered self-positioning limit feeding system (that is, a previous station) feeds seed potatoes into the elastic self-positioning pre-dicing system orderly, the long axis of the seed potatoes is in the vertical direction at this time, the seed potatoes fall into the entrance of the V-shaped space of the elastic V-shaped self-positioning device, the drive shafts I-28 rotate to drive the flexible silicone conveying belts I-16 to move under the enveloping of the V-shaped profile of the flexible silicone conveying belts I-16, the seed potatoes are further conveyed straightly, and the three pairs of V-rollers I-17 at the middle position adapt to the shape and size of the seed potatoes under the elasticity of the first springs I-18 to ensure the stability and reliability of the straight conveying process. The potato seeds are further conveyed vertically downward, the outer enveloping clamping plates I-15 adapt to the shape and size of the seed potatoes again, the outer enveloping clamping plates I-15 undergo position change of certain angle about the drive shafts under the action of the arc guide rails and the elasticity of the second springs I-26 to adapt to the shape and size of the seed potatoes, and the flexible silicone conveying belts I-16 herein have stronger enveloping property on the seed potatoes under the elasticity of the first springs I-18, so that the seed potatoes are in stable contact with the streamlined cutter I-06 to implement the half cut process. Further, the seed potatoes are in contact with the cutting edge of the streamlined cutter I-06. Under the combined action of V-shaped positioning, elastic clamping and flexible conveying, the subjected friction and the gravity of the seed potatoes are greater than the impact of the streamlined cutter I-06 on the seed potatoes, which can realize the stable half cut of the seed potatoes. With the streamlined shape widened from top to bottom, the half-cut seed potatoes are separated adaptively and enter the flexible silicone conveying belts I-16 of the triangular conveying device. The flexible silicone conveying belts I-16 of the triangular separation device have large friction, which ensures that the seed potatoes will not deviate, roll over or the like before entering the designated station. After being conveyed by the triangular separation device, the half-cut seed potatoes are finally conveyed to the center of a conveying tray of an intelligent dicing station (that is, next station) for intelligent identification and detection of the dices.

Although the specific embodiments of the present invention are described above in combination with the accompanying drawings, the protection scope of the present invention is not limited thereto. It should be understood by those skilled in the art that various modifications or variations could be made by those skilled in the art based on the technical solution of the present invention without any creative effort, and these modifications or variations shall fall into the protection scope of the present invention.

The invention claimed is:

1. An elastic self-positioning pre-dicing device comprising:
   a V-shaped self-positioning device including a first elastic conveying face and a second elastic conveying face, the first elastic conveying face and the second elastic conveying face symmetrically arranged in a V-shape forming a V-shaped conveying space, the first elastic conveying face and the second elastic conveying face being respectively provided by a first conveying mechanism and a second conveying mechanism, and materials are kept in a vertical state when arriving at a bottom end between the two elastic conveying faces when conveying the two elastic conveying faces;

a cutter arranged at the bottom end between the two elastic conveying faces to cut the materials in half along a longitudinal axis; and a separation device arranged at a lower part of the cutter, the separation device being configured to convey the materials cut in half to a next stage respectively, wherein:

each of the first conveying mechanism and the second conveying mechanism includes:

at least three rollers that include an upper roller, a lower roller, and at least one remaining roller of the at least three rollers that is arranged between the upper roller and the lower roller and serves as at least one middle roller, a flexible conveying belt that is sleeved on the upper roller and the lower roller, a center shaft that is coaxially arranged in a middle of each of the at least one middle roller, two ends of the center shaft extending out of the at least one middle roller, and the two ends of the center shaft extending out of the at least one middle roller are provided with through holes, and a fixed shaft that penetrates through the through holes and is then fixed to an outer frame, and the at least one middle roller is configured to move along the fixed shaft.

2. The elastic self-positioning pre-dicing device according to claim 1, wherein a plurality of springs are coaxially arranged on the fixed shaft between the through holes of the center shaft and the outer frame, and the fixed shaft is arranged in a direction of extending to two sides of the V-shaped conveying space, so that the V-shaped conveying space is configured to be adaptively adjusted according to a size of the materials.

3. The elastic self-positioning pre-dicing device according to claim 1, wherein a motor drives a first drive shaft to rotate, a first drive gear is arranged on the first drive shaft, the first drive gear is meshed with a second drive gear, and the second drive gear is arranged on a second drive shaft, the first drive shaft serves as a power drive shaft of one set of conveying mechanism, and the second drive shaft serves as a power drive shaft of the other set of drive mechanism.

4. The elastic self-positioning pre-dicing device according to claim 1, further comprising a first outer enveloping clamping plate and a second outer enveloping clamping plate, the first outer enveloping clamping plate is arranged outside the first conveying mechanism, one end of the first outer enveloping clamping plate is connected to a power output shaft of the first conveying mechanism through a bearing, and the other end of the first outer enveloping clamping plate extends freely to a tail end of the first conveying mechanism, wherein:

the second outer enveloping clamping plate is arranged outside the second conveying mechanism, and the second outer enveloping clamping plate is symmetrically arranged with the first outer enveloping clamping plate;

an arc guide bar is arranged outside each of the first outer enveloping clamping plate and the second outer enveloping clamping plate, a plurality of springs are arranged on the arc guide bars, and the arc guide bars are connected to the outer frame; and each of the first outer enveloping clamping plate and the second outer enveloping clamping plate are configured to rotate along the corresponding power output shafts to adapt to the materials of different sizes.

5. The elastic self-positioning pre-dicing device according to claim 1, wherein:

the separation device includes a third conveying mechanism and a fourth conveying mechanism, and the third conveying mechanism and the fourth conveying mechanism are arranged in an inverted V shape and interfaced with the first elastic conveying face and the second elastic conveying face of the V-shaped conveying space; and the materials cut in half are conveyed by the third conveying mechanism and the fourth conveying mechanism respectively, and the cut surfaces of the materials are in contact with the third and fourth conveying mechanisms.

6. The elastic self-positioning pre-dicing device according to claim 5, wherein a baffle configured to prevent the materials from turning over is arranged at a set position above each of the third conveying mechanism and the fourth conveying mechanism.

7. The elastic self-positioning pre-dicing device according to claim 1, wherein the cutter is formed in a streamlined shape that widens from top to bottom.

8. An elastic self-positioning pre-dicing method comprising:

limiting and conveying materials by a plurality of flexible conveying belts arranged in a V-shape, the flexible conveying belts being respectively provided by conveying mechanisms, the materials falling vertically in a direction of a longitudinal axis, and finally fall to a cutter;

cutting the materials in half along the longitudinal axis by the cutter;

conveying the materials cut in half to a next process respectively; and during the falling of the materials, adaptively adjusting the plurality of flexible conveying belts according to a size of the materials, wherein:

each of the conveying mechanisms includes:

at least three rollers that include an upper roller, a lower roller, and at least one remaining roller of the at least three rollers that is arranged between the upper roller and the lower roller and serves as at least one middle roller, and the respective flexible conveying belt is sleeved on the upper roller and the lower roller, a center shaft that is coaxially arranged in a middle of each of the at least one middle roller, two ends of the center shaft extending out of the at least one middle roller, and the two ends of the center shaft extending out of the at least one middle roller are provided with through holes, and a fixed shaft that penetrates through the through holes and is then fixed to an outer frame, and the at least one middle roller is configured to move along the fixed shaft.

* * * * *